US010336642B2

United States Patent
Endo et al.

(10) Patent No.: US 10,336,642 B2
(45) Date of Patent: Jul. 2, 2019

(54) METHOD FOR MANUFACTURING FORMED GLASS AND HEATING APPARATUS

(71) Applicant: AGC Inc., Chiyoda-ku (JP)

(72) Inventors: Shingo Endo, Tokyo (JP); Makoto Fujii, Tokyo (JP); Satoshi Kanasugi, Tokyo (JP); Shosuke Kimura, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/632,892

(22) Filed: Jun. 26, 2017

(65) Prior Publication Data

US 2017/0369354 A1  Dec. 28, 2017

(30) Foreign Application Priority Data

Jun. 27, 2016  (JP) ................ 2016-126653

(51) Int. Cl.
| | | |
|---|---|---|
| C03B 23/00 | (2006.01) | |
| C03B 23/023 | (2006.01) | |
| C03B 29/08 | (2006.01) | |
| C03C 3/087 | (2006.01) | |
| C03C 3/085 | (2006.01) | |
| C03C 3/097 | (2006.01) | |
| C03C 15/00 | (2006.01) | |
| C03C 17/30 | (2006.01) | |
| C03C 21/00 | (2006.01) | |

(52) U.S. Cl.
CPC ...... *C03B 23/0086* (2013.01); *C03B 23/0013* (2013.01); *C03B 23/0026* (2013.01); *C03B 23/0235* (2013.01); *C03B 29/08* (2013.01); *C03C 3/085* (2013.01); *C03C 3/087* (2013.01); *C03C 3/097* (2013.01); *C03C 15/00* (2013.01); *C03C 17/30* (2013.01); *C03C 21/002* (2013.01); *C03C 2217/734* (2013.01); *Y02P 40/57* (2015.11)

(58) Field of Classification Search
CPC ................ C03B 23/0086; C03B 23/0235
See application file for complete search history.

(56) References Cited

U.S. PATENT DOCUMENTS

| | | |
|---|---|---|
| 9,010,153 B2 | 4/2015 | Ukrainczyk et al. |
| 2003/0182966 A1* | 10/2003 | Fotheringham ..... C03B 23/0086 65/33.2 |

(Continued)

FOREIGN PATENT DOCUMENTS

| | | |
|---|---|---|
| JP | 5479468 | 4/2014 |
| WO | WO 2010/150801 A1 | 12/2010 |

OTHER PUBLICATIONS

Kuhn et al., "Thermal expansion of synthetic fused silica as a function of OH content and fictive temperature", Journal of Non-Crystalline Solids, 355 (2009) 323-326 (Year: 2009).*

*Primary Examiner* — Cynthia Szewczyk
(74) *Attorney, Agent, or Firm* — Oblon, McClelland, Maier & Neustadt, L.L.P.

(57) ABSTRACT

A method for manufacturing a formed glass includes using a heating apparatus. The heating apparatus includes a heating element and a heat reservoir having a transmittance of 50% or more in a wavelength of 0.5 µm to 2.5 µm. The heat reservoir is arranged between the heating element and a glass substrate as an object to be heated. The glass substrate is heated with the heating element, and the glass substrate is formed into a desired shape.

13 Claims, 4 Drawing Sheets

(56) References Cited

U.S. PATENT DOCUMENTS

| | | | |
|---|---|---|---|
| 2009/0127727 A1* | 5/2009 | Matsushima | ....... C03B 23/0258 264/1.7 |
| 2012/0086138 A1 | 4/2012 | Taguchi et al. | |
| 2015/0203394 A1 | 7/2015 | Ukrainczyk et al. | |

* cited by examiner

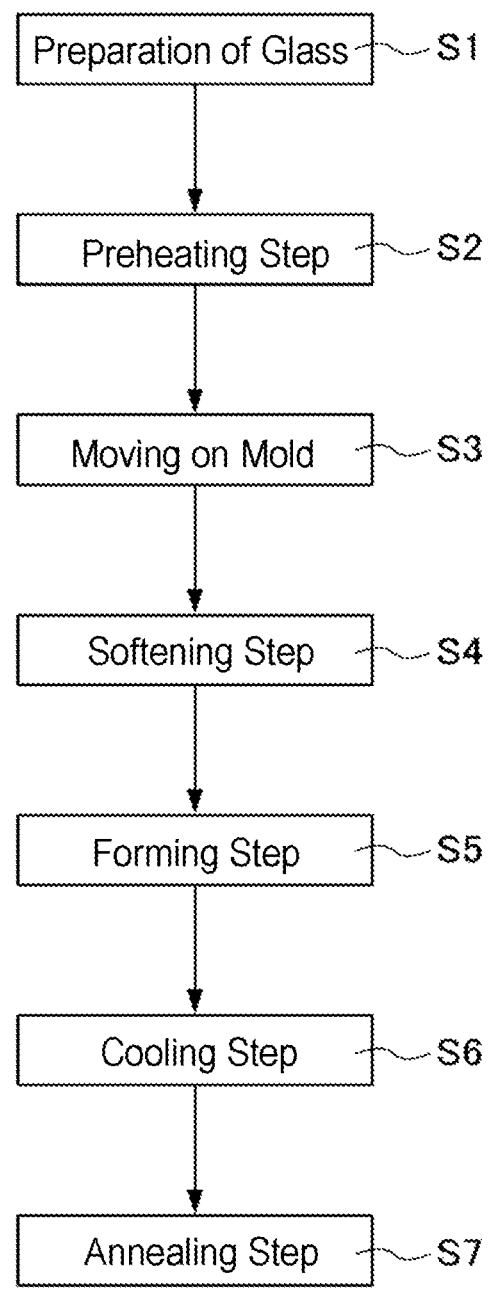

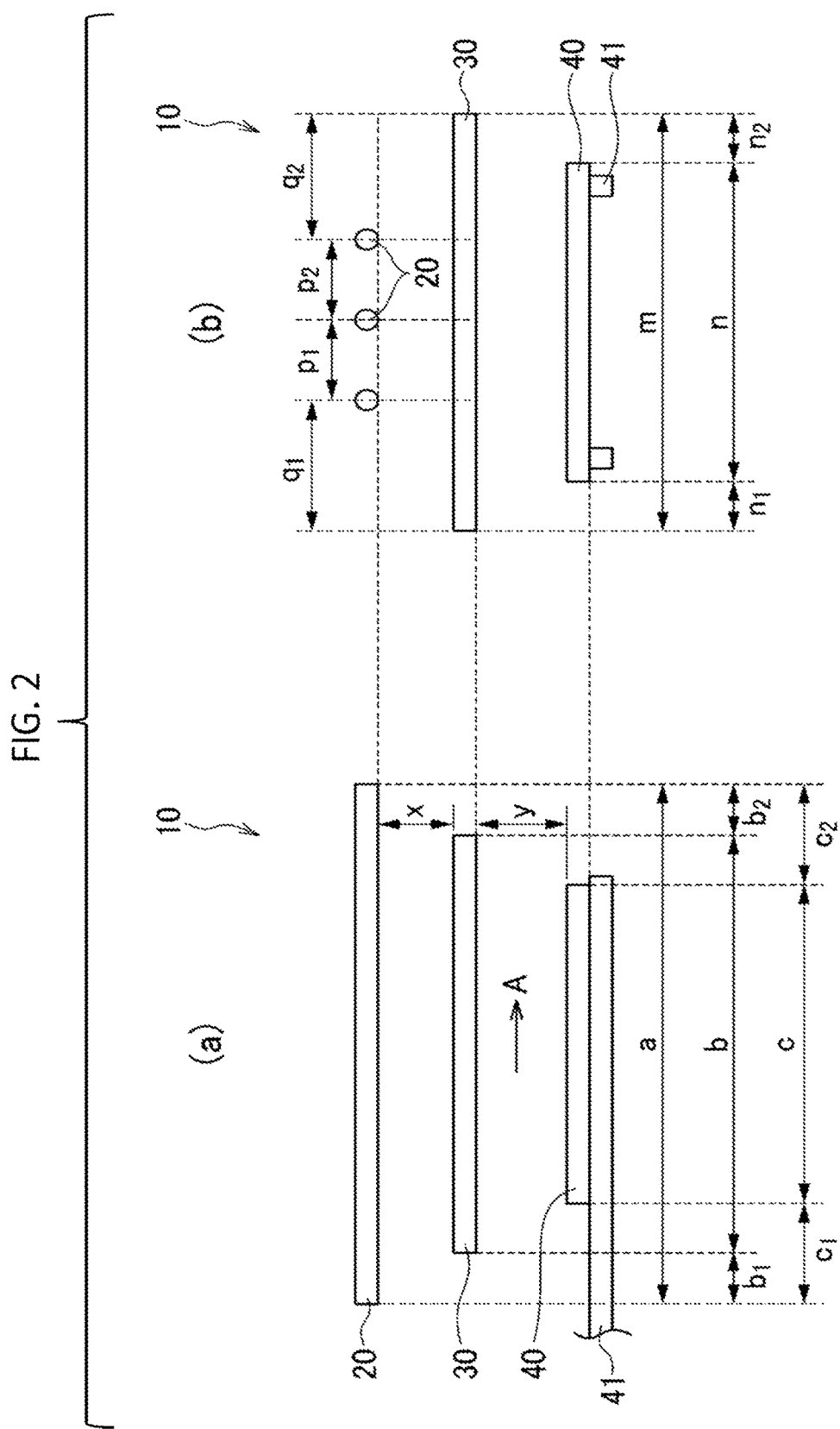

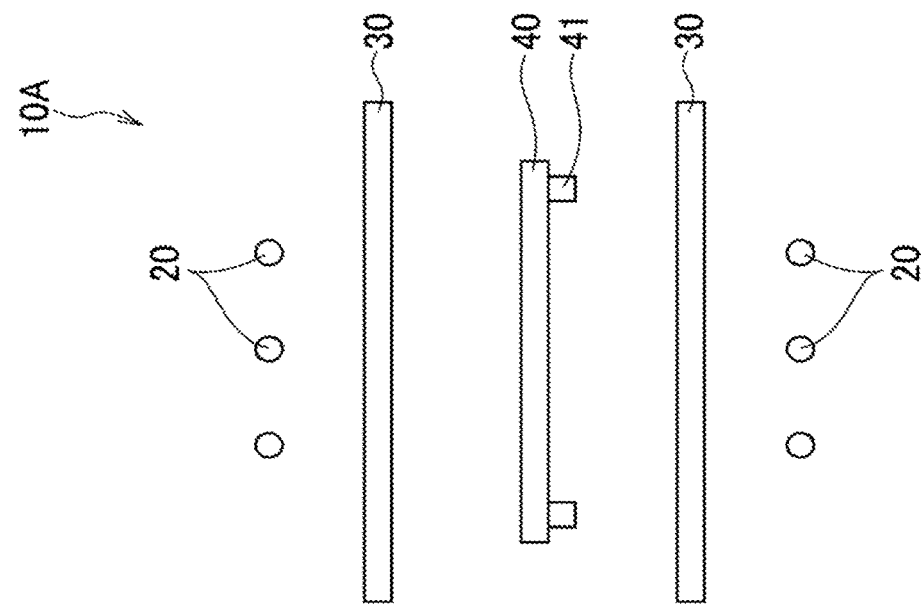
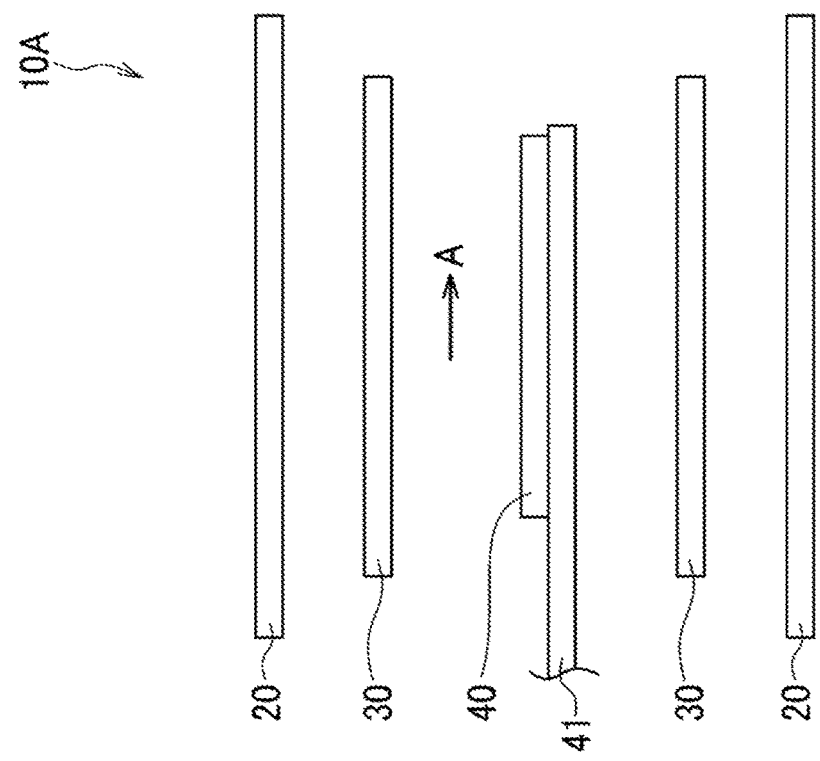

METHOD FOR MANUFACTURING FORMED GLASS AND HEATING APPARATUS

CROSS-REFERENCE TO RELATED APPLICATIONS

This application claims priority from Japanese Patent Application No. 2016-126653 filed on Jun. 27, 2016, the entire subject matter of which is incorporated herein by reference.

BACKGROUND OF THE INVENTION

Technical Field

The present invention relates to a method for manufacturing a formed glass, and a heating apparatus.

Background Art

A bent glass having a bent part in at least a part thereof is generally manufactured by passing through forming steps of heating a glass substrate placed on a forming mold to a softening point and deforming the glass substrate along the forming mold. Patent Document 1 discloses a method of placing a glass substrate on a mold having a forming surface, heating the glass substrate with a radiation heater and sagging the glass substrate on the forming surface, thereby forming a desired surface profile. Patent Document 2 discloses a method of inserting a metal plate between a radiation heater and an object to be heated, once holding and storing radiation heat from the radiation heater in the metal plate, radiating the heat to the objected to be heated, and uniformly heating the object to be heated.

Patent Document 1: Japanese Patent No. 5479468
Patent Document 2: WO 2010/150801 A1

SUMMARY OF THE INVENTION

In the manufacturing method disclosed in Patent Document 1, radiation heat from a radiation heater is directly radiated to a glass, thereby rapidly heating the glass. Therefore, there is a possibility that the glass breaks. It is considered that when radiation heat from the radiation heater radially expands and is directly radiated to a glass, the glass is heterogeneously heated, and as a result, breakage of a glass occurs.

On the other hand, in Patent Document 2, radiation heat from a radiation heater is once held and stored in a metal plate provided between the radiation heater and an object to be heated, and then, the radiation heat is reradiated to the objected to be heated to heat the object. However, the radiation heat from the radiation heater is intercepted with the metal plate, and the object to be heated is heated with the radiation heat from the metal plate. Therefore, during heating, the objected to be heated cannot be warmed until the metal plate warms with the radiation heater, and during cooling, the objected to be heated is not cooled until the metal plate get cold even after switching off the radiation heater. Thus, there are problems that thermal responsibility of the objected to be heated is poor and productivity is decreased, and further improvement is required.

The present invention has been made in view of the above problems, and an object of the present invention is to provide a method for manufacturing a formed glass by efficiently heating a glass to form the glass into a desired shape while preventing the occurrence of breakage of a glass, and a heating apparatus.

An aspect of the present invention includes the following embodiments.

(1) A method for manufacturing a formed glass, the method comprising:

using a heating apparatus comprising a heating element and a heat reservoir having a transmittance of 50% or more in a wavelength of 0.5 μm to 2.5 μm, the heat reservoir being arranged between the heating element and a glass substrate as an object to be heated;

heating the glass substrate with the heating element; and forming the glass substrate into a desired shape.

(2) The method for manufacturing a formed glass according to (1), wherein the heat reservoir has the transmittance of 93% or less in a wavelength of 0.5 μm to 2.5 μm.

(3) The method for manufacturing a formed glass according to (1) or (2), wherein the heat reservoir has a coefficient of linear expansion at a temperature of 0° C. to 800° C. of $-30 \times 10^{-7}$/° C. to $30 \times 10^{-7}$/° C.

(4) The method for manufacturing a formed glass according to any one of (1) to (3), wherein the heat reservoir has a thickness of 1 mm to 10 mm.

(5) The method for manufacturing a formed glass according to any one of (1) to (4), wherein the formed glass has a bent part in at least a part thereof.

(6) The method for manufacturing a formed glass according to any one of (1) to (5), wherein the formed glass comprises, as a composition expressed in mol %, from 50 to 80% of $SiO_2$, from 0.1 to 25% of $Al_2O_3$, from 3 to 30% of $Li_2O+Na_2O+K_2O$, from 0 to 25% of MgO, from 0 to 25% of CaO and from 0 to 5% of $ZrO_2$.

(7) The method for manufacturing a formed glass according to any one of (1) to (6), the method comprising at least one step of:

a preheating step of preheating the glass substrate;

a softening step of softening the glass substrate;

a forming step of forming a bent part in the glass substrate; and an annealing step of annealing the formed glass, wherein at least one step of the preheating step, the softening step, the forming step and the annealing step is conducted using the heating apparatus.

(8) The method for manufacturing a formed glass according to (7), wherein the heating apparatus is used in the preheating step, and in the preheating step, the glass substrate is heated by heat stored in the heat reservoir, and then, the glass substrate is heated with the heating element.

(9) A heating apparatus comprising a heating element and a heat reservoir having a transmittance of 50% or more in a wavelength of 0.5 μm to 2.5 μm, the heat reservoir being arranged between the heating element and a glass substrate as an object to be heated.

(10) The heating apparatus according to (9), wherein the heat reservoir has a coefficient of linear expansion at a temperature of 0° C. to 800° C. of $-30 \times 10^{-7}$/° C. to $30 \times 10^{-7}$/° C.

(11) The heating apparatus according to (9) or (10), wherein the heat reservoir has a thickness of 1 mm to 10 mm.

According to the method for manufacturing a formed glass, a heating apparatus including a heating element and a heat reservoir having a transmittance of 50% or more in a wavelength of 0.5 μm to 2.5 μm, the heat reservoir being arranged between the heating element and a glass substrate as an object to be heated, is used, and the glass substrate is heated with the heating element. Therefore, the glass substrate is heated with radiation heat radiated from the heating element, radiation heat radiated from the heat reservoir, and convective heating. As a result, the glass substrate is uniformly heated, and breakage of a glass during heating can be prevented. Furthermore, radiation heat from the heating element passing through the heat reservoir can also be utilized, and the glass can be efficiently heated.

The heating apparatus includes a heating element and a heat reservoir having a transmittance of 50% or more in a wavelength of 0.5 μm to 2.5 μm, the heat reservoir being arranged between the heating element and a glass substrate as an object to be heated. Therefore, the glass substrate can be uniformly heated with radiation heat radiated from the heating element, radiation heat from the heat reservoir, and convective heating. As a result, the glass substrate is uniformly heated, and breakage of a glass during heating can be prevented. Furthermore, radiation heat from the heating element, which passes through the heat reservoir, can also be utilized, and the glass substrate can be efficiently heated.

BRIEF DESCRIPTION OF THE DRAWINGS

FIG. 1 is a flow chart showing manufacturing process of a formed glass.

FIG. 2 shows schematic views showing the positional relationship of structural elements including an object to be heated in the heating apparatus in an aspect of the present invention.

FIG. 4A and FIG. 4B are schematic views showing the positional relationship of structural elements including an object to be heated in the heating apparatus of modification example.

DETAILED DESCRIPTION OF THE INVENTION

Figure 3A:
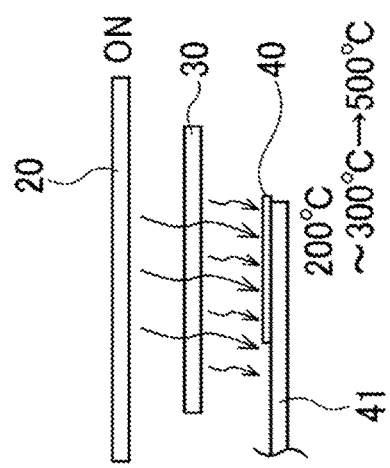
FIG. 3A, FIG. 3B and FIG. 3C are schematic views of preheating step shown in FIG. 1.

The method for manufacturing a formed glass in an aspect of the present invention, and one embodiment of the heating apparatus used in the method are described in detail below by reference to the drawings.

The heating apparatus of the present embodiment is used to manufacture a formed glass having a bent part in at least a part thereof by heating a glass substrate to, for example, a temperature equal to or higher than a softening point thereof (equilibrium viscosity: $10^{6.5}$ Pa·s to $10^{12.5}$ Pa·s).

The equilibrium viscosity can be measured by, e.g. beam bending method (ISO 7884-4: 1987), fiber elongation viscometer method (ISO 7884-3: 1987), parallel plate viscometer (ASTM C338-93: 2003), or sinking bar viscometer (ISO 7884-5: 1987).

The formed glass of the present embodiment means a glass having been subjected to a processing such that a pattern formed by concave and convex parts is transferred to at least one main surface of a glass substrate, a glass (bent glass) having a bent part imparted to at least one main surface of a glass substrate, and the like. The formed glass can be manufactured by the forming method described hereinafter. The present embodiment can uniformly heat a glass substrate and is particularly suitable for the manufacturing of a bent glass.

Soda lime glass, aluminosilicate glass, aluminoborosilicate glass, lithium disilicate glass and the like can be used as a glass composition constituting the glass substrate in the present embodiment. The heating apparatus of the present embodiment is particularly excellent when aluminosilicate glass or boroslicate glass is used in the glass substrate. Those glass substrates have high Young's modulus and high coefficient of expansion, and when those glass substrates are heated, high thermal stress is generated. Therefore, those glass substrates are easy to break when rapidly heated by the conventional heating apparatus. The heating apparatus of the present embodiment can uniformly heat those glass substrates, and can reduce in-plane temperature distribution of the glass substrate, and as a result, those glass substrates can be efficiently heated while suppressing breakage thereof.

Specific example of the glass composition includes a glass including, as a composition expressed in mol %, from 50 to 80% of $SiO_2$, from 0.1 to 25% of $Al_2O_3$, from 3 to 30% of $Li_2O+Na_2O+K_2O$, from 0 to 25% of MgO, from 0 to 25% of CaO and from 0 to 5% of $ZrO_2$, although not particularly limited thereto. More specifically, examples of the composition of a glass are as follows. For example, the term "from 0 to 25% of MgO" used herein means that MgO is not an essential component, but may be contained in an amount up to 25%.

The following glass (i) is included in the scope of the soda lime glass, and the following glasses (ii) and (iii) are included in the scope of the aluminosilicate glass.

(i) A glass including, as a composition expressed in mol %, from 63 to 73% of $SiO_2$, from 0.1 to 5.2% of $Al_2O_3$, from 10 to 16% of $Na_2O$, from 0 to 1.5% of $K_2O$, from 0 to 5% of $Li_2O$, from 5 to 13% of MgO, and from 4 to 10% of CaO.

(ii) A glass including, as a composition expressed in mol %, from 50 to 74% of $SiO_2$, from 1 to 10% of $Al_2O_3$, from 6 to 14% of $Na_2O$, from 3 to 11% of $K_2O$, from 0 to 5% of $Li_2O$, from 2 to 15% of MgO, from 0 to 6% of CaO, and from 0 to 5% of $ZrO_2$, wherein the total content of $SiO_2$ and $Al_2O_3$ is 75% or less, the total content of $Na_2O$ and $K_2O$ is from 12 to 25%, and the total content of MgO and CaO is from 7 to 15%.

(iii) A glass including, as a composition expressed in mol %, from 68 to 80% of $SiO_2$, from 4 to 10% of $Al_2O_3$, from 5 to 15% of $Na_2O$, from 0 to 1% of $K_2O$, from 0 to 5% of $Li_2O$, from 4 to 15% of MgO, and from 0 to 1% of $ZrO_2$.

(iv) A glass including, as a composition expressed in mol %, from 67 to 75% of $SiO_2$, from 0 to 4% of $Al_2O_3$, from 7 to 15% of $Na_2O$, from 1 to 9% of $K_2O$, from 0 to 5% of $Li_2O$, from 6 to 14% of MgO, and from 0 to 1.5% of $ZrO_2$, wherein the total content of $SiO_2$ and $Al_2O_3$ is from 71 to 75%, the total content of $Na_2O$ and $K_2O$ is from 12 to 20%, and when CaO is contained, the content thereof is less than 1%.

In the composition expressed in mol %, incorporation of trace component(s) is not taken into consideration, and the composition expressed in mol % is calculated based on a ratio of a content of a target oxide to a total content of the above-described oxides.

When a glass is colored and such a colored glass is used, a colorant may be added to the glass in an amount that does not disturb the achievement of desired chemical reinforcing properties. Examples of the colorant that can be used include compounds having absorption in a visible region, such as $Co_3O_4$, MnO, $MnO_2$, $Fe_2O_3$, NiO, CuO, $Cu_2O$, $Cr_2O_3$, $V_2O_5$, $Bi_2O_3$, $SeO_2$, $TiO_2$, $CeO_2$, $Er_2O_3$ and $Nd_2O_3$ that are metal oxides of Co, Mn, Fe, Ni, Cu, Cr, V, Bi, Se, Ti, Ce, Er and Nd, respectively.

When a colored glass is used as the glass substrate, a coloring component (at least one component selected from the group consisting of metal oxides of Co, Mn, Fe, Ni, Cu, Cr, V, Bi, Se, Ti, Ce, Er and Nd) may be contained in the glass in an amount of 7% or less, in mole percentage on the basis of oxides. When the content of the coloring component exceeds 7%, a glass is easy to devitrify. The content of the coloring component is preferably 5% or less, more preferably 3% or less, and still more preferably 1% or less. The glass substrate may appropriately contain $SO_3$, a chloride, a fluoride or the like as a fining agent during melting.

Manufacturing process of the formed glass is briefly described by reference to FIG. 1. In step S1, a glass substrate as a material to be formed is prepared, and the glass substrate is supported by appropriate means such as a support, a lower mold or an arm. In step S2, the glass substrate is preheated to, for example, about 500° C. (equilibrium viscosity: about $10^{17}$ Pa·s). In step S3, the preheated glass substrate is moved on a forming mold. The glass substrate placed on the forming mold is heated to, for example, a temperature equal to or higher than a softening point of about 700° C. to 750° C. (equilibrium viscosity: $10^{6.5}$ Pa·s to $10^{12.5}$ Pa·s) in step S4, and the glass substrate is formed along a forming surface of the forming mold in step S5. The glass substrate formed is cooled in a cooling step of step S6, and then, the glass substrate is maintained at an annealing temperature of about 550° C. (equilibrium viscosity: $10^{12.5}$ Pa·s to $10^{17}$ Pa·s) for a predetermined time in an annealing step of step S7, thereby removing internal stress in the glass substrate.

The heating apparatus of the present embodiment is used in at least one step of the above steps of forming a bent glass, such as a preheating step of preheating the glass substrate, a softening step of softening the glass substrate, a forming step of forming the glass substrate into a desired shape and an annealing step of reheating the glass substrate. In the heating apparatus, heating temperature and the like differ depending on steps used. Therefore, different conditions and structural members are used depending on desired properties.

As shown in FIG. 2, a heating apparatus 10 of the present embodiment includes a plurality (three in the embodiment shown in the drawing) of heating elements (sheathed heaters) 20 radiating radiation heat and a heat reservoir 30 arranged between the heating element 20 and a glass substrate 40 as an object to be heated. The glass substrate 40 is shown as a flat plate glass as a whole in FIG. 2, but a glass substrate having a bent part already formed thereon depending on the above steps is also included in the glass substrate 40 of the present embodiment.

Radiation heater such as a near ultraviolet heater or a medium infrared heater can be used as the heating element 20. Short wavelength infrared heater having high heating efficiency is preferably used. A plurality of the heating elements 20 are allocated through alignment in a horizontal direction with being parallel to each other.

A material capable of transmitting 50% or more, preferably 70% or more and more preferably 80% or more, of heat rays in a wavelength of 0.5 µm to 2.5 µm (short wavelength region) is used as the heat reservoir 30. As the upper limit of transmittance, the transmittance is preferably 93% or less. The heat reservoir 30 appropriately absorbs near infrared rays and the like from the heating element 20, becomes easy to store heat, and can exhibit its function.

The transmittance can be calculated based on the calculation method as described in, e.g. ISO 9050: 2003 or JIS R 3106: 1998.

The heat reservoir has a high transmittance of 50% or more in a wavelength of 0.5 µm to 2.5 µm. Therefore, despite that the heat reservoir 30 is arranged between the heating element 20 and the glass substrate 40, the glass substrate 40 can be directly heated by radiation heat from the heating element 20. Furthermore, the heat reservoir 30 has appropriate heat ray absorbing property such that the transmittance in a wavelength of 0.5 µm to 2.5 µm is 93% or less, and therefore, the heat reservoir 30 can appropriately store radiation heat from the heating element 20. As a result, the glass substrate 40 can be heated by radiation heat reradiated from the heat reservoir 30 and convective heating.

The coefficient of linear expansion of the heat reservoir 30 at a temperature of 0° C. to 800° C. is $-30\times10^{-7}/°$ C. to $30\times10^{-7}/°$ C., and preferably $-3\times10^{-7}/°$ C. to $3\times10^{-7}/°$ C. Because of small coefficient of linear expansion, breakage of the heat reservoir 30 itself by thermal strain due to the heating by the heating element 20 is suppressed, durability of the heat reservoir 30 is improved, and durability of the heating apparatus 10 itself is improved. Particularly, when the coefficient of linear expansion of the heat reservoir 30 at a temperature of 0° C. to 800° C. is $-3\times10^{-7}/°$ C. to $3\times10^{-7}/°$ C., the heat reservoir 30 has durability to rapid heating by the heating element 20 and rapid cooling, and production efficiency of the formed glass can be improved.

The coefficient of linear explanation can be measured by, e.g. push-rod type continuous measurement (ISO 7991: 1987), push-rod type two-point temperature (JIS R3102: 1995), or interferometer-type method (JIS R 3251: 1995).

Glass, glass ceramic (crystallized glass), quartz and the like can be used as the heat reservoir 30. Of those, glass ceramic having appropriate heat ray absorbing property and small coefficient of linear expansion is preferably used.

The heat reservoir 30 is preferably a material satisfying the above-described transmittance and coefficient of linear expansion, and glass ceramic having the following composition is preferably used.

Glass ceramic including, as a composition expressed in mol %, from 63 to 70% of $SiO_2$, from 18 to 25% of $Al_2O_3$, from 3 to 5% of $Li_2O$, from 0.2 to 1% of MgO, from 0 to 2% of ZnO, from 0 to 3% of BaO, from 1 to 5% of $TiO_2$, from 1 to 3% of $ZrO_2$, from 0 to 2% of $P_2O_5$, from 0.1 to 1% of $Na_2O$, from 0.1 to 1% of $K_2O$ and from 1 to 2% of $V_2O_5$.

The heat reservoir 30 has a thickness of preferably 1 mm to 10 mm, and more preferably 3 mm to 6 mm. When the thickness of the heat reservoir 30 is 1 mm or more, mechanical strength is obtained and warpage is difficult to be occurred. When the thickness is 10 mm or less, heating and cooling after heating do not require much time, and working efficiency is improved.

The positional relationship of the heating element 20, the heat reservoir 30 and the glass substrate 40 is described below by reference to FIG. 2. The glass substrate 40 is conveyed along a longitudinal direction of the heating element 20 from an arrow A direction and is heated, but there is no particular limitation.

As shown in the view (a) of FIG. 2, the distance x between the lower surface of the heating element 20 and the upper surface of the heat reservoir 30 is preferably 0 mm to 100 mm, and more preferably 0 mm to 50 mm. The distance y between the lower surface of the heat reservoir 30 and the upper surface of the glass substrate 40 is preferably 1 mm to 100 mm, and more preferably 1 mm to 50 mm. When the distances x and y are equal to or more than the respective lower limits, uniform heating can be performed, and when those are equal to or less than the respective upper limits, heating efficiency is improved.

The length a of the heating element 20 is preferably 100 mm to 5,000 mm, and more preferably 500 mm to 3,000 mm, from the standpoint of the preparation of the heating element 20.

The distances b1 and b2 between the edges of the heating element 20 and the edges of the heat reservoir 30, in a longitudinal direction of the heating element 20, are preferably −100 mm to 100 mm and more preferably −60 mm to 60 mm. In the case where the length a of the heating element 20 is shorter than the length b of the heat reservoir 30, the distances b1 and b2 are indicated as "minus". To uniformly heat the heat reservoir 30, b1=b2 is preferred.

The distances c1 and c2 between the edges of the heating element 20 and the edges of the glass substrate 40, in a longitudinal direction of the heating element 20, are preferably 0 mm or more in order to make in-plane temperature distribution of the glass substrate 40 uniform. Furthermore, c1=c2 is preferred, and (b1, b2)<(c1, c2) is more preferred.

As shown in the view (b) of FIG. 2, the width m of the heat reservoir 30 in a width direction of the heating element 20 (direction perpendicular to a conveying direction of the glass substrate 40) is preferably 100 mm to 5,000 mm, and more preferably 500 mm to 3,000 mm. For the convenience of explanation, a longitudinal direction of the heating element 20 is parallel to a conveying direction of the glass substrate 40, but the present invention is not limited to this embodiment. Those directions may be vertical to each other, and there is no particular limitation.

The distances n1 and n2 between the edges of the heat reservoir 30 and the edges of the glass substrate 40, in a width direction of the heating element 20, are preferably −300 mm to 300 mm, and more preferably −150 mm to 150 mm. In the case where the length m of the heat reservoir 30 is shorter than the length n of the glass substrate 40, the distances n1 and n2 are indicated as "minus". Furthermore, n1=n2 is further preferred for uniformly heating the glass substrate 40.

Three heating elements 20 are arranged symmetrically to the center in a width direction of the heat reservoir 30. When the distances between the adjacent heating elements 20 are p1 and p2, those distances are preferably 1 mm to 100 mm, and more preferably 10 mm to 50 mm. Thanks to this, uniform heating is conducted by the heating element 20, uniform heating of the heat reservoir 30 and the glass substrate 40 is improved. The number of the heating elements 20 is three for the convenience of explanation, but the number is not limited to three, and can be appropriately increased or decreased depending on the size of the heat reservoir 30 and the glass substrate 40 and the performance of the heating element 20.

In a width direction of the heating element 20, when the distances between the centers of two end heating elements 20 of three heating elements 20 and the edges of the heat reservoir 30 in a width direction are q1 and q2, those distances are preferably −100 mm to 100 mm, and more preferably −50 mm to 50 mm. This can improve temperature uniformity of the heat reservoir 30 and can suppress excessive heating of a holding part (not shown) and the like for fixing the heat reservoir 30 in the heating apparatus.

Figure 3B:
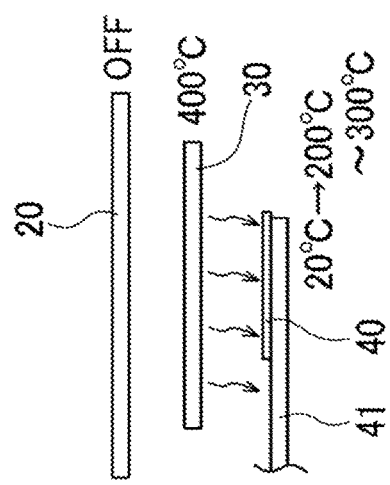

One example that the heating apparatus 10 of the present embodiment is applied to a preheating step (see FIG. 1) is described by reference to FIG. 3A to FIG. 3C. As shown in FIG. 3A, at the stage that the preheating step of the glass substrate 40 to be treated at one step before has been completed, current application to the heating element 20 is interrupted, and the heat reservoir 30 has been heated to about 400° C. by remaining heat. When the glass substrate 40 having a temperature of about 20° C. (ordinary temperature) is supported by an arm 41 and inserted in the lower part of the heating element 20 in this state as shown in FIG. 3B, the temperature of the glass substrate 40 increases to 200° C. to 300° C. by radiation heat from the heat reservoir 30 and convective heating.

Figure 3C:
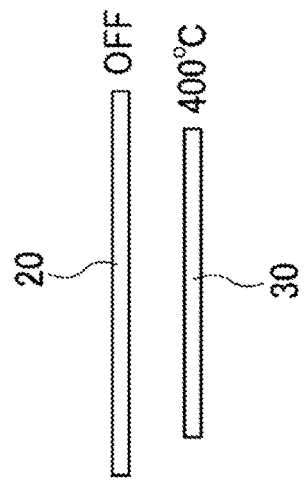

When current application to the heating element 20 is initiated as shown in FIG. 3C after heating the glass substrate 40 to about 200° C. to 300° C., the glass substrate 40 is efficiently heated to a preheating temperature of about 500° C. by both radiation heat from the heat reservoir 30 and convective heating, and radiation heat from the heating element 20 passing through the heat reservoir 30 and directly acting on the glass substrate 40. Current application to the heating element 20 may be initiated simultaneously with inserting the glass substrate 40 having ordinary temperature in the lower part of the heating element 20, as shown in FIG. 3B.

Thus, the glass substrate 40 is mildly heated stepwise. As a result, breakage of the glass substrate 40 by thermal strain during heating can be prevented. Furthermore, when current application to the heating element 20 is interrupted after completion of the preheating, because heat capacity stored in the heat reservoir 30 is not so large, the heat reservoir 30 is relatively quickly cooled to a temperature appropriate to preheat a next glass substrate. As a result, heat cycle is shortened, and productivity is improved.

The above heating of the glass substrate 40 is not limited to the preheating step, and can be similarly applied to each step of a softening step, a forming step or an annealing step and the like, although the final temperature of the glass substrate 40 after heating differs. For example, in the case of applying the heating apparatus 10 of the present embodiment to a forming step, the glass substrate 40 is heated to a temperature of about 700° C. to 750° C. which is equal to or higher than a softening point thereof (equilibrium viscosity: about $10^{6.5}$ Pa·s to $10^{12.5}$ Pa·s) and then formed.

Examples of the forming method used in the forming step include a differential pressure forming method such as a vacuum forming method or a pressure forming method, a self-weight forming method and a press forming method. The desired forming method is selected depending on a glass shape after forming.

The differential pressure forming method is a method of giving differential pressure to front and back surfaces in the state of softening a glass substrate, deforming the glass substrate to adapt the glass substrate to a mold, and forming the glass substrate into a desired shape. In a vacuum forming method, a glass substrate is placed on a given mold corresponding to a shape of a formed glass after forming, a clamp mold is placed on the glass substrate, and the periphery of the glass substrate is sealed. Thereafter, differential pressure is given to front and back surfaces of the glass substrate by reducing pressure in a space between the mold and the glass substrate by a pump, thereby forming the glass substrate into a desired shape.

In the pressure forming method, a glass substrate is placed on a given mold corresponding to a shape of a formed glass, a clamp mold is placed on the glass substrate, and the periphery of the glass substrate is sealed. Thereafter, pressure is given to the upper surface of the glass substrate by compressed air to give differential pressure to front and back surfaces of the glass substrate, thereby forming the glass substrate into a desired shape. The vacuum forming method and the pressure forming method may be combined with each other.

The self-weight forming method is a method of placing a glass substrate on a prescribed mold corresponding to a shape of a formed glass, heating the glass substrate to soften, bending the glass substrate by gravity to adapt the glass substrate to the mold, and forming the glass substrate into a prescribed shape.

The press forming method is a method of placing a glass substrate between prescribed molds (upper mold and lower mold) corresponding to a shape of a formed glass, applying press load between the upper and lower molds in the state of softening the glass substrate, bending the glass substrate to adapt the glass substrate to the molds, and forming the glass substrate into a prescribed shape.

Of the above forming methods, the differential pressure forming method and self-weight forming method are particularly preferred as a method of obtaining a formed glass. According to the differential pressure forming method, forming can be performed without contacting a forming mold with a second surface of first and second surfaces of a formed glass, and as a result, concave-convex shape defects such as scratches and depressions can be reduced. Therefore, the second surface can be used as an outer surface of an assembly, that is, a surface that is touched by a user in ordinary use state, and this is preferred from the standpoint of improvement in visibility.

Depending on a shape of a formed glass, at least two forming methods of the above forming methods may be used in combination.

As described above, according to the method for manufacturing a formed glass of the present embodiment, the heating apparatus 10 including the heating element 20 and the heat reservoir 30 having a transmittance of 50% or more in a wavelength of 0.5 µm to 2.5 µm, the heat reservoir being arranged between the heating element 20 and the glass substrate 40 as an object to be heated, is used, and the glass substrate 40 is heated by the heating element 20. Therefore, the glass substrate 40 is heated by radiation heat radiated from the heating element 20, radiation heat radiated from the heat reservoir 30 and convective heating. As a result, heating of the glass substrate 40 is uniformed, and the glass can be prevented from breaking during heating. Furthermore, the glass substrate can be efficiently heated by radiation heat from the heating element 20, which passes through the heat reservoir 30.

The coefficient of linear expansion at a temperature of 0° C. to 800° C. of the heat reservoir 30 is $-30 \times 10^{-7}/°$ C. to $30 \times 10^{-7}/°$ C. Therefore, the breakage of the heat reservoir 30 itself by the heating from the heating element 20 can be prevented.

At least one step of the preheating step of preheating the glass substrate 40, the softening step of softening the glass substrate 40, the forming step of forming the glass substrate 40 into a desired shape and the annealing step of reheating the glass substrate 40 formed is conducted using the heating apparatus 10. Therefore, the heating of the glass in the step using the heating apparatus 10 can be efficiently conducted with preventing the glass from breaking.

In the preheating step in which the heating apparatus 10 is used, the glass substrate 40 is heated by heat stored in the heat reservoir 30, and is further heated by the heating element 20. Therefore, breakage of the glass during heating can be prevented.

The heating apparatus 10 of the present embodiment includes the heating element 20 and the heat reservoir 30 having a transmittance of 50% or more in a wavelength of 0.5 µm to 2.5 µm, the heat reservoir being arranged between the heating element 20 and the glass substrate 40 as an object to be heated. Therefore, the glass substrate 40 is heated by radiation heat radiated from the heating element 20, radiation heat radiated from the heat reservoir 30 and convective heating. As a result, the heating of the glass substrate 40 is uniformed, and breakage of a glass during heating can be prevented. Furthermore, the glass substrate can be efficiently heated by radiation heat from the heating element 20, which passes through the reservoir 30.

Modification Example

FIG. 4A and FIG. 4B are schematic views of a heating apparatus 10A of a modification example. In the heating apparatus 10A of the modification example, the heating element 20 and the heat reservoir 30 are arranged at both upper surface side and lower surface side of the glass substrate 40. The positional relationship of the heating element 20, the heat reservoir 30 and the glass substrate 40 is the same as the case in the above-described heating apparatus 10 of the above embodiment. The heating element 20 or the heat reservoir 30 in the heating apparatus may be arranged at only the lower surface side of the glass substrate 40.

The heat reservoir 30 is not limited to a flat plate shape, and may have a bent part in at least a part thereof. The bent part may be appropriately adjusted depending on the arrangement of the heating element 20 and the shape of the glass substrate 40. In this case, the positional relationship of the heating element 20, the heat reservoir 30 and the glass substrate 40 may be appropriately adjusted, for example, such that a flat part and a bent part are arranged at the same intervals.

The present invention is not limited to the above-described embodiment and modification example, and can be appropriately changed or modified.

As the glass substrate 40, for example, one sheet of plate-like glass can be used, but a plurality of plate-like glasses that are arranged side by side may be used. In this case, for the distances c1 and c2 between the edges of the heating element 20 and the edges of the glass substrate 40, the edges of glasses arranged at the endmost of a plurality of plate-like glasses can be used as the edges of the glass substrate 40.

Furthermore, the glass substrate 40 may be subjected to the following steps and treatments.
(Grinding/Polishing Step)
Grinding or polishing may be applied to at least one main surface of an object such as the flat plate-like glass substrate 40 or the formed glass substrate 40.
(Edge Processing/Drilling Step)
The edge of the glass substrate 40 may be subjected to a treatment such as chamfering. Rather than mechanical grinding, a general processing called R chamfering or C chamfering is preferably conducted. However, a processing such as etching may be conducted, and the processing is not particularly limited. The flat plate-like glass substrate 40 may be previously subjected to edge processing, and then subjected to a forming step.

Regardless of before and after a forming step, the glass substrate 40 may be subjected to drilling.
(Chemically Strengthening Step)
The glass substrate 40 may be subjected to chemical strengthening to form a compressive stress layer in the surface thereof, thereby enhancing strength and scratch resistance. The chemical strengthening is a treatment that alkali metal ions (typically Na ion) having small ionic radius of a glass surface is exchanged with alkali metal ions (typically K ion) having larger ionic radius by ion exchange at a temperature equal to or less than a glass transition point thereof, thereby forming a compressive stress layer in the glass surface. The chemically strengthening treatment can be carried out by a conventional method. Generally a glass is dipped in a potassium nitrate molten salt. The number of dipping is 1 time or more, the dipping may be carried out 2 times or more under the condition of different molten salts. About 10 mass % of potassium carbonate may be mixed with the molten salt, and the resulting mixture may be used. By this, cracks on a surface layer of the glass can be removed, and a glass having high strength can be obtained. When a silver component such as silver nitrate is mixed with potassium nitrate during chemical strengthening, the glass has ion-exchanged silver ion in the surface thereof. As a result, antibiotic properties can be given to the glass.

(Surface Treatment Step)

The glass substrate 40 may be subjected to a step of forming various surface treatment layers as necessary. Examples of the surface treatment layer include an antiglare treatment layer, an antireflective treatment layer and an antifouling treatment layer. Those may be used in combination. The surface treatment layer may be formed on any surface of a first main surface or second main surface of the glass substrate 40. Those surface treatment layers are preferably formed after the forming step, but the antiglare treatment layer may be formed before the forming step.

(Antiglare Treatment Layer)

The antiglare treatment layer is a layer bringing about an effect of mainly scattering reflected light and reducing glare of reflected light by reflection of a light source. The antiglare treatment layer may be formed by processing the surface of the glass substrate 40 and may be formed by separately depositing a layer. As the method for forming the antiglare treatment layer, examples thereof include a method for forming concave-convex shape having desired surface roughness by applying a surface treatment to at least a part of the glass substrate 40 by chemical (for example, etching) method or a physical (for example, sand blasting) method. Furthermore, as the forming method, a treating liquid may be applied or sprayed to at least a part of the glass substrate 40, thereby forming a concave-convex structure.

A concave-convex structure may be formed on at least a part of the glass substrate by a thermal method.

(Antireflective Treatment Layer)

The antireflective treatment layer is layer bringing about an effect of reducing reflectance and reducing glare by refection of light. Additionally, when the antireflective treatment layer is used in a display device, the layer can enhance transmittance of light from the display device and can enhance visibility of the display device.

When the antireflective treatment layer is an antireflective film, the film is preferably formed on a first main surface or second main surface of the glass substrate 40, but there is no limitation. The constitution of the antireflective film is not limited so long as it can suppress reflection of light. For example, a constitution including a laminate of a high refractive index layer having a refractive index in a wavelength of 550 nm of 1.9 or more and a low refractive index layer having a refractive index in a wavelength of 550 nm of 1.6 or less, or a constitution containing a layer having a refractive index in a wavelength of 550 nm of 1.2 to 1.4 and including a film matrix having mixed therein hollow particles or pores can be used.

(Antifouling Treatment Layer)

The antifouling treatment layer is a layer suppressing adhesion of an organic substance or an inorganic substance to a surface of a glass substrate or a layer bringing about an effect of easily removing adherents by cleaning such as wiping off even in the case where an organic substance or an inorganic substance is attached to a surface of a glass substrate.

When the antifouling treatment layer is formed as an antifouling film, the film is preferably formed on a first main surface and second main surface of the glass substrate 40 or on other surface treatment layer. The antifouling treatment layer is not limited so long as it can give antifouling properties to the glass substrate 40 obtained. Above all, the antifouling treatment layer preferably includes a fluorine-containing organosilicon compound film obtained by a hydrolytic condensation reaction of a fluorine-containing organosilicon compound.

EXAMPLES

The present invention is described below by reference to the following examples. However, the present invention is not construed as being limited to those examples.

(Preparation Steps of Formed Glass)

A formed glass was prepared by the procedures of preparation of glass substrate as an object to be heated (S1), a preheating step (S2), a softening step (S4), a forming step (S5) and a cooling step (S6).

(Preparation of Glass Substrate (S1))

Aluminosilicate glass (Dragontrail (registered trade mark), manufactured by Asahi Glass Co., Ltd.) was used as the glass substrate 40.

(Heating Apparatus)

A heating apparatus including the heating element 20 and the heat reservoir 30 as shown in FIG. 2 was used, the glass substrate 40 was arranged as described after, and a formed glass was prepared. The glass substrate 40 was placed on a mold having a shape such that a desired formed glass is obtained.

Short wavelength infrared heater was used as the heating element 20.

Glass ceramic Z including, as a composition expressed in mol %, 65.5% of $SiO_2$, 22% of $Al_2O_3$, 4.5% of $Li_2O$, 0.5% of MgO, 2% of $TiO_2$, 2.5% of $ZrO_2$, 1% of $P_2O_5$, 0.5% of $Na_2O$ and 0.3% of $K_2O$ was used as the heat reservoir 30. The glass ceramic Z had a transmittance of 70% to 93% in a wavelength of 0.5 μm to 2.5 μm and a coefficient of thermal expansion at a temperature of 0° C. to 800° C. of $-3 \times 10^{-7}$/° C. to $-1 \times 10^{-7}$/° C.

The glass substrate 40, the heating element 20 and the heat reservoir 30 were arranged as shown in FIG. 2. Specifically, the heating element 20 had a length a of 1,100 mm, and the heat reservoir 30 had a length b of 1,200 mm, a width m of 900 mm and a thickness of 5 mm. The glass substrate 40 had a length c of 300 mm, a width n of 600 mm and a thickness of 1 mm, and three heating elements 20 were placed side by side in a longitudinal direction. Distance x between the lower surface of the heating element 20 and the upper surface of the heat reservoir 30 was 40 mm, and distance y between the lower surface of the heat reservoir 30 and the upper surface of the glass substrate 40 was 40 mm.

Both distances b1 and b2 between the edges of the heating element 20 and the edges of the heat reservoir 30 in a longitudinal direction of the heating element 20 were −50 mm, and both distances c1 and c2 between the edges of the heating element 20 and the edges of the glass substrate 40 in a longitudinal direction of the heating element 20 were 100 mm.

Both distances n1 and n2 between the edges of the heat reservoir 30 and the edges of the glass substrate 40 in a width direction of the heat reservoir 30 were 150 mm. The number of the heating elements 20 used was 21. Both distances p1 and p2 of the adjacent heating elements 20 were 45 mm, and both distances q1 and q2 between the edges of the heat reservoir 30 and the centers of the heating elements 20 at both sides of the heating elements 20 in a width direction of the heat reservoir 30 were 0 mm.

(Preheating Step (S2))

The heat reservoir 30 was previously heated to 400° C. in the preheating step, the glass substrate 40 was moved to the lower part of the heat reservoir 30 heated, and simultaneously temperature rising of the heating element 20 was initiated. The glass substrate 40 was heated to about 550° C. such that equilibrium viscosity of the glass substrate reached about $10^{17}$ Pa·s.

(Softening Step (S4))

In the softening step, the glass substrate was further heated to about 800° C. such that equilibrium viscosity of the glass substrate reached about $10^9$ Pa·s.

(Forming Step (S5))

After the temperature could be maintained at a desired temperature in the softening step, the glass substrate 40 was placed along a mold using a self-weight forming method, and forming was performed to obtain a formed glass.

(Cooling Step (S6))

After completion of the forming step, current application to the heating element 20 was stopped, and the forming apparatus and the formed glass were cooled to 550° C. in a short period of time over 5 minutes.

The same operation as in the above preparation steps of a formed glass was conducted 10 times. Any formed glass in 30 sheets of the formed glasses obtained was free of breakage and chipping, and high productivity was confirmed. Furthermore, even though temperature rising and cooling were repeated, the heating apparatus did not cause disadvantages, and the heat reservoir 30 using glass ceramic Z was not damaged.

While the present invention has been described in detail and with reference to specific embodiments thereof, it will be apparent to one skilled in the art that various changes and modifications can be made therein without departing from the spirit and scope thereof.

DESCRIPTION OF REFERENCE NUMERALS AND SIGNS 10, 10A Heating apparatus
20 Heating element
30 Heat reservoir
40 Glass substrate (glass)

The invention claimed is:

1. A method for manufacturing a formed glass, the method comprising:
　heating a glass substrate; and
　forming the glass substrate into a desired shape,
　wherein the heating of the glass substrate comprises:
　　applying an electric current to a heating element to heat a heating reservoir having a transmittance of 50% or more in a wavelength of 0.5 μm to 2.5 μm by heat from the heating element;
　　placing the glass substrate such that the heat reservoir is positioned between the heating element and the glass substrate;
　　heating a glass substrate by heat from the heating reservoir without applying the electric current to the heating element,
　　subsequently applying the electric current to the heating element to heat the glass substrate by heat from the heating element and from the heating reservoir.

2. The method for manufacturing a formed glass according to claim 1, wherein the heat reservoir has the transmittance of 93% or less in a wavelength of 0.5 μm to 2.5 μm.

3. The method for manufacturing a formed glass according to claim 1, wherein the heat reservoir has a coefficient of linear expansion at a temperature of 0° C. to 800° C. of $-30 \times 10^{-7}/°$ C. to $30 \times 10^{-7}/°$ C.

4. The method for manufacturing a formed glass according to claim 1, wherein the heat reservoir has a thickness of 1 mm to 10 mm.

5. The method for manufacturing a formed glass according to claim 1, wherein the formed glass has a bent part in at least a part thereof.

6. The method for manufacturing a formed glass according to claim 1,
　wherein the formed glass comprises, as a composition expressed in mol %, from 50 to 80% of $SiO_2$, from 0.1 to 25% of $Al_2O_3$, from 3 to 30% of $Li_2O+Na_2O+K_2O$, from 0 to 25% of MgO, from 0 to 25% of CaO and from 0 to 5% of $ZrO_2$.

7. The method for manufacturing a formed glass according to claim 1, wherein the heating of the glass substrate is at least one of:
　to preheat the glass substrate;
　to soften the glass substrate;
　to form a bent part in the glass substrate; and
　to anneal the formed glass.

8. The method for manufacturing a formed glass according to claim 7,
　wherein the heating of the glass substrate is to preheat the glass substrate.

9. A heating apparatus comprising:
　a heating element;
　a heat reservoir having a transmittance of 50% or more in a wavelength of 0.5 μm to 2.5 μm, and positioned between the heating element and a glass substrate to be heated; and
　a switch programmed to select on or off of the heat element depending on a temperature of the glass substrate to be heated.

10. The heating apparatus according to claim 9, wherein the heat reservoir has a coefficient of linear expansion at a temperature of 0° C. to 800° C. of $30 \times 10^{-7}/°$ C. to $30 \times 10^{-7}/°$ C.

11. The heating apparatus according to claim 9, wherein the heat reservoir has a thickness of 1 mm to 10 mm.

12. The heating apparatus according to claim 9, wherein the switch is programmed to select on when a temperature of the glass substrate to be heated is 200° C. to 300° C.

13. The heating apparatus according to claim 9, wherein the switch is further programmed to select on or off depending on a temperature of the heat reservoir.

* * * * *